(12) United States Patent
Yang et al.

(10) Patent No.: US 7,070,140 B2
(45) Date of Patent: Jul. 4, 2006

(54) FILM HOLDER FOR AN ADVANCED PHOTO SYSTEM

(75) Inventors: Chin Wen Yang, Banchiau (TW); Tsan Yao Hung, Tainan (TW)

(73) Assignee: BENQ Corporation, Taoyuan (TW)

( * ) Notice: Subject to any disclaimer, the term of this patent is extended or adjusted under 35 U.S.C. 154(b) by 119 days.

(21) Appl. No.: 10/977,901

(22) Filed: Oct. 29, 2004

(65) Prior Publication Data

US 2005/0092860 A1   May 5, 2005

(30) Foreign Application Priority Data

Oct. 30, 2003  (TW) .............................. 92219269 U

(51) Int. Cl.
*G03B 23/02*   (2006.01)
(52) U.S. Cl. ...................................... 242/340; 396/538
(58) Field of Classification Search ................ 242/340, 242/348.4; 396/512–514, 535–538; 355/41
See application file for complete search history.

(56) References Cited

U.S. PATENT DOCUMENTS

| | | | | |
|---|---|---|---|---|
| 2,609,739 | A | * | 9/1952 | Tatro |
| 3,548,728 | A | * | 12/1970 | Ariyasu et al. |
| 5,677,759 | A | * | 10/1997 | Tanimoto et al. |
| 5,754,314 | A | * | 5/1998 | Araki et al. |
| 5,815,739 | A | * | 9/1998 | Marra et al. |
| 5,826,816 | A | * | 10/1998 | Yamaguchi |
| 5,926,654 | A | * | 7/1999 | SanGregory |
| 6,139,203 | A | * | 10/2000 | Philipps |
| 6,698,945 | B1 | * | 3/2004 | Omori |

\* cited by examiner

*Primary Examiner*—William A. Rivera
(74) *Attorney, Agent, or Firm*—Quintero Law Office

(57) ABSTRACT

A film holder for an advanced photo system. The film holder includes a transmission mechanism, a support mechanism, a rotating member and a resilient element. The support mechanism is connected to the transmission mechanism and has a sliding groove obliquely formed thereon. The rotating member is disposed in the support mechanism and has a first transmission shaft and a sliding portion engaged with and sliding in the sliding groove of the support mechanism. The resilient element is disposed on the support mechanism and connected to the sliding portion of the rotating member.

13 Claims, 5 Drawing Sheets

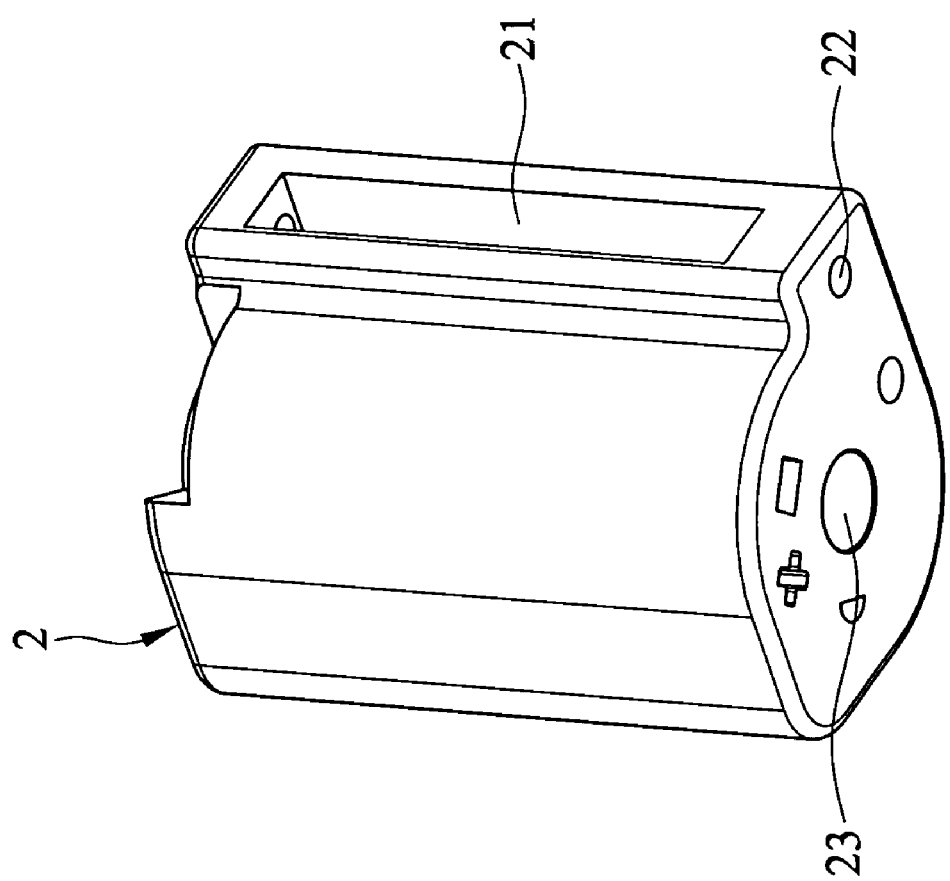

FILM HOLDER FOR AN ADVANCED PHOTO SYSTEM

BACKGROUND OF THE INVENTION

1. Field of the Invention

The present invention relates to a film holder for an advanced photo system, and in particular to a film holder with simplified structure.

2. Description of the Related Art

An advanced photo system (APS) usually includes a 10 film scanner, a film holder and a film cassette. A film is received in the film cassette, which is then normally placed in the film holder. The film holder is then placed in the film scanner and the film scanner scans the film therein to output corresponding images.

Referring to FIG. 1, a conventional film holder 1 includes a support mechanism 11 and a transmission mechanism 12 connected thereto. The support mechanism 11 has a cover 13 and a housing 14. The cover 13 is disposed on the housing 14. Additionally, a first transmission shaft (not shown), second transmission shaft (not shown), first motor (not shown), second motor (not shown) and sensor (not shown) are all disposed in the support mechanism 11. The first transmission shaft is connected to the first motor, and the second transmission shaft to the second motor. Moreover, a transmission gear set (not shown) is disposed between the first transmission shaft and the first motor.

Referring to FIG. 2, a film cassette 2 includes a masking gate 21, an unlocking hole 22 and a film transmission hole 23. The unlocking hole 22 and film transmission hole 23 are formed on the bottom of the film cassette 2. A film (not shown) is received in the film cassette 2.

When the film cassette 2 is received in the support mechanism 11 of the film holder 1 and the support mechanism 11 is closed, the unlocking hole 22 and film transmission hole 23 thereof engage the first transmission shaft and second transmission shaft, respectively. At this point, the sensor in the support mechanism 11 detects the film cassette 2 and outputs a corresponding signal to actuate the first motor. The masking gate 21 is then unlocked by rotation of the first transmission shaft and transmission of the transmission gear set. After the masking gate 21 of the film cassette 2 is unlocked, the second motor rotates the second transmission shaft. At this point, the film in the film cassette 2 is transmitted into the transmission mechanism 12 of the film holder 1 via the masking gate 21.

Accordingly, the conventional film holder 1 requires two motors and a transmission gear set to transmit the film in the film cassette 2. Thus, the inner structure of the film holder 1 or support mechanism 11 thereof is complicated. Moreover, control of film transmission is difficult and the manufacturing cost of the film holder 1 increases.

Hence, there is a need for an improved film holder for an advanced photo system. The present film holder utilizes a simplified structure to transmit the film in the film cassette.

SUMMARY OF THE INVENTION

Accordingly, an object of the invention is to provide a film holder for an advanced photo system. The film holder comprises a transmission mechanism, a support mechanism, a rotating member and a resilient element. The support mechanism is connected to the transmission mechanism and has a sliding groove obliquely formed thereon. The rotating member is disposed in the support mechanism and has a first transmission shaft and a sliding portion engaged with and sliding in the sliding groove of the support mechanism. The resilient element is disposed on the support mechanism and connected to the sliding portion of the rotating member.

The film holder further comprises a second transmission shaft disposed in the support mechanism.

The film holder further comprises a motor disposed in the support mechanism and connected to the second transmission shaft.

The support mechanism further comprises a connecting portion. The resilient element is connected between the connecting portion and the sliding portion of the rotating member.

The support mechanism further comprises a wall. The connecting portion and sliding groove are formed on the wall.

The film holder further comprises a resilient retardant portion formed on the wall or support mechanism. The resilient element is a spring.

The film holder further comprises a film cassette supported by the support mechanism.

The film cassette further comprises a masking gate, an unlocking hole, a film transmission hole and a film. The first transmission shaft of the rotating member is engaged with the unlocking hole and rotates to unlock the masking gate by means of the sliding portion sliding in the sliding groove.

The film holder further comprises a second transmission shaft disposed in the support mechanism and engaged with the film transmission hole of the film cassette. The film is transmitted to the transmission mechanism via the masking gate by rotation of the second transmission shaft.

The film holder further comprises a resilient retardant portion formed on the support mechanism. The film cassette is disposed in the support mechanism by means of retard of the resilient retardant portion.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 2 is a schematic perspective view showing a film cassette;

DETAILED DESCRIPTION OF THE INVENTION

Figure 1:
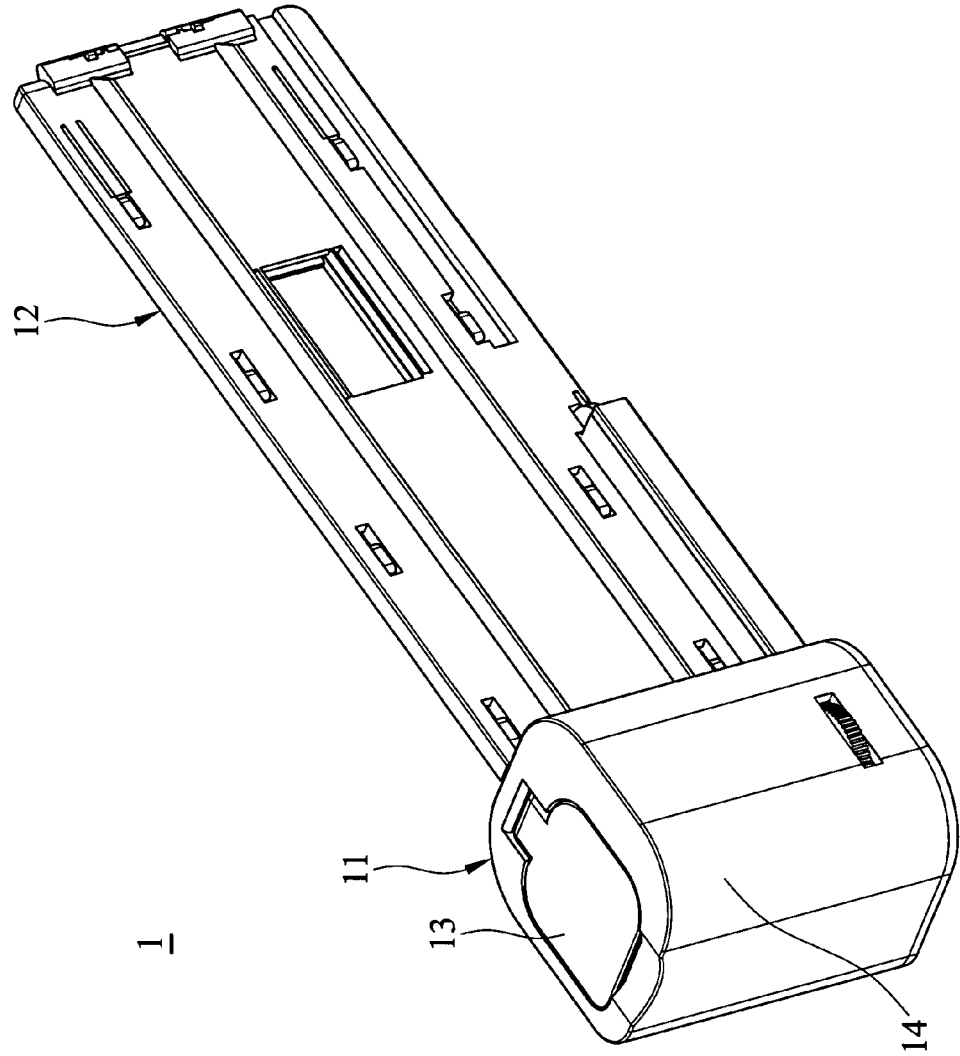
FIG. 1 is a schematic perspective view showing a conventional film holder.
Figure 3A:
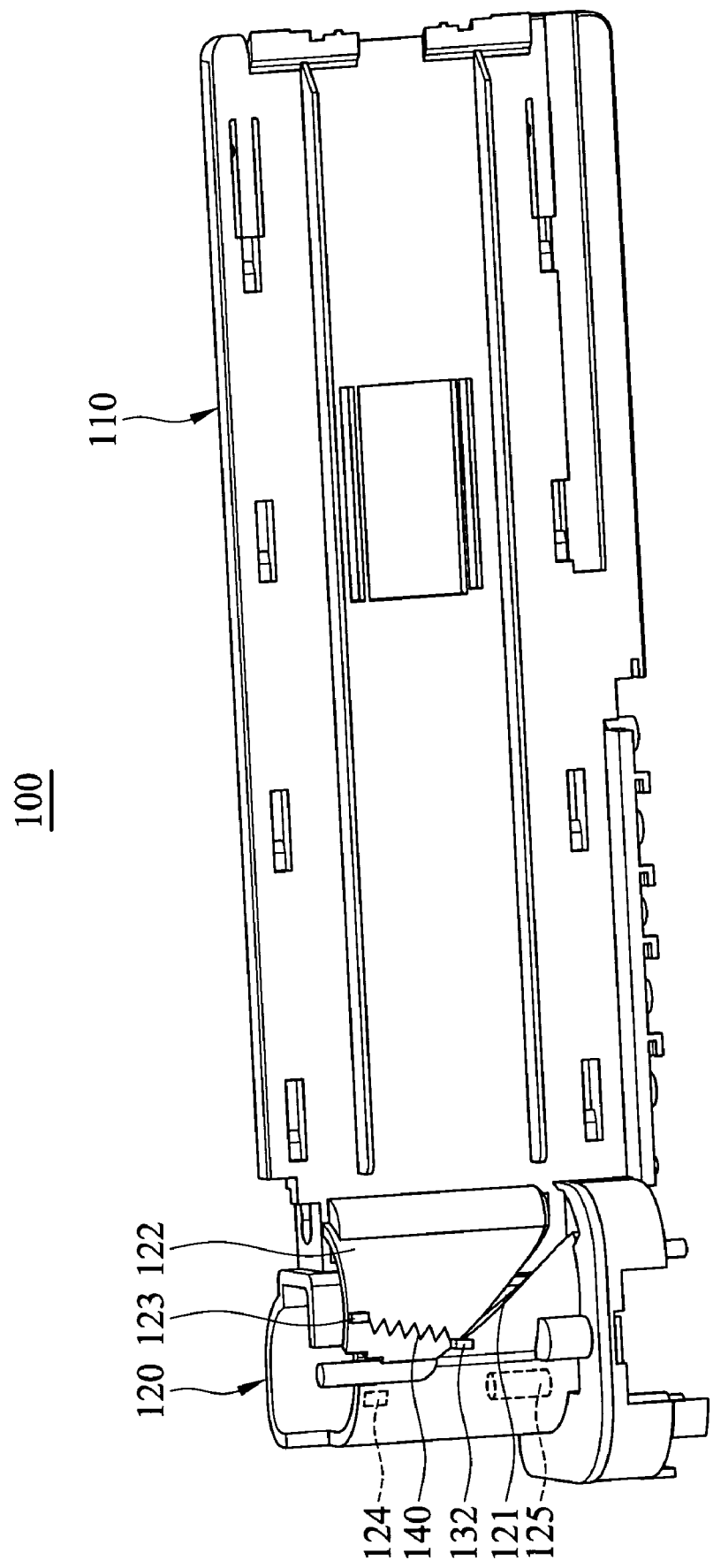
FIG. 3A is a schematic perspective view showing the film holder of the invention.
Figure 4:
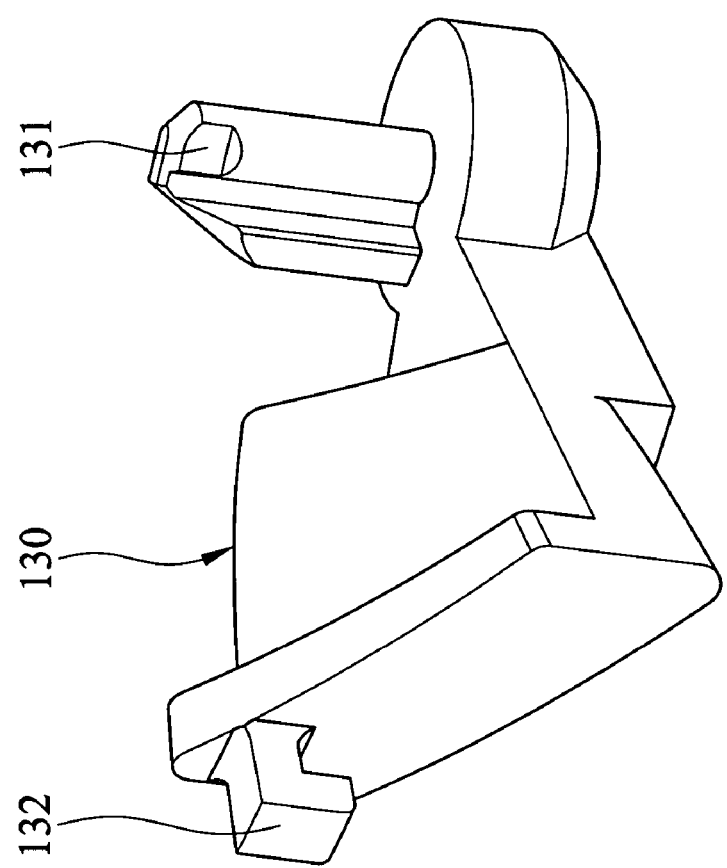
FIG. 4 is a schematic perspective view showing the rotating member of the film holder of the invention.

Referring to FIG. 2 and FIG. 3A, the film holder 100 for an advanced photo system (APS) receives a film cassette 2. As shown in FIG. 3A and FIG. 4, the film holder 100 comprises a transmission mechanism 110, a support mechanism 120, a rotating member 130 and a resilient element 140. The support mechanism 120 is connected to the transmission mechanism 110 and has a sliding groove 121. The rotating member 130 is disposed in the support mechanism 120 and has a first transmission shaft 131 and a sliding portion 132. The resilient element 140 is disposed on the support mechanism 120.

As shown in FIG. 3A, the support mechanism 120 has a curved wall 122. The sliding groove 121 is obliquely formed on the curved wall 122. The support mechanism 120 has a connecting portion 123 formed on the upper portion of the curved wall 122. Specifically, the sliding portion 132 of the rotating member 130 is engaged with and slides in the sliding groove 121 on the curved wall 122 of the support mechanism 120. The resilient element 140 is connected between the connecting portion 123 and the sliding portion 132 of the rotating member 130. In this embodiment, the resilient element 140 is a spring.

As shown in FIG. 3A, the support mechanism 120 has a resilient retardant portion 124 formed on the upper inside of the wall 122.

Additionally, a second transmission shaft 125 is disposed in the support mechanism 120, and a motor (not shown) is disposed in the support mechanism 120 and is connected to the second transmission shaft 125.

The following description is directed to the operation of the film holder 100.

Figure 3B:
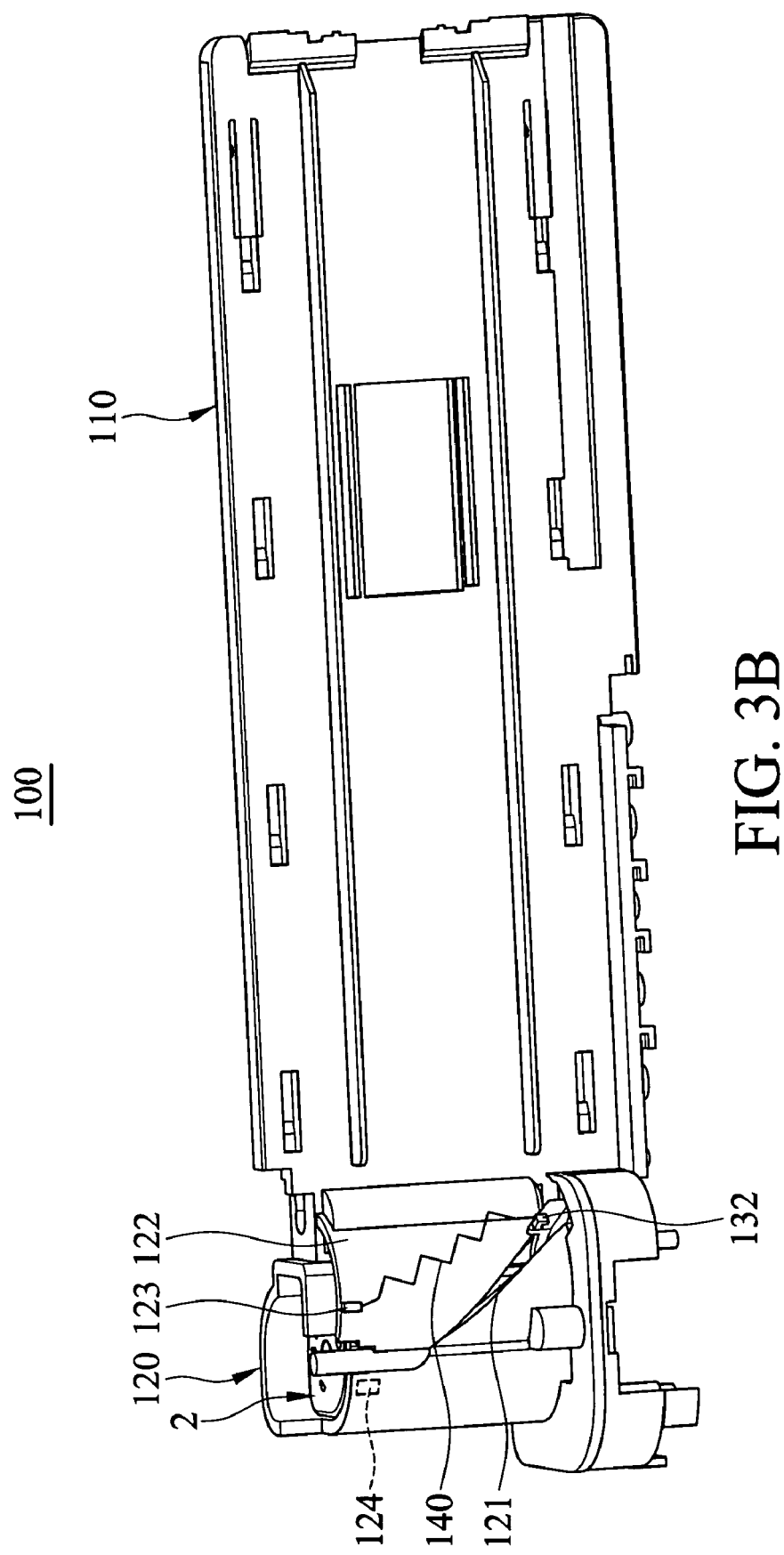
FIG. 3B is another schematic perspective view showing the film holder of the invention.

As shown in FIG. 2 and FIG. 3A, when the film cassette 2 is not received in the support mechanism 120, the resilient element 140 is in an original position. When the film cassette 2 with a film received therein is received in the support mechanism 120, the unlocking hole 22 on the bottom of the film cassette 2 engages the first transmission shaft 131 of the rotating member 130. Since the sliding portion 132 of the rotating member 130 is engaged with and slides in the sliding groove 121 of the support mechanism 120, the sliding portion 132 slides downward along the sliding groove 121 obliquely formed on the curved wall 122 when the film cassette 2 moves downward. At this point, the first transmission shaft 131 of the rotating member 130 rotates counterclockwise to unlock the masking gate 21 of the film cassette 2 due to the downward motion of the sliding portion 132. As shown in FIG. 3B, when the film cassette 2 moves downward to a lowest position in the support mechanism 120, the sliding portion 132 of the rotating member 130 slides downward to the lowest part of the sliding groove 121 as well. At this point, the resilient element 140 is extremely elongated and the film cassette 2 is disposed in the support mechanism 120 by means of the top thereof retarded by the resilient retardant portion 124. The film transmission hole 23 on the bottom of the film cassette 2, at the same time, engages the second transmission shaft 125 in the support mechanism 120. The motor then rotates the second transmission shaft 125. The film in the film cassette 2 is transmitted into the transmission mechanism 110 via the masking gate 21 by rotation of the second transmission shaft 125. Finally, the film in the transmission mechanism 110 is scanned and corresponding images thereof are output.

In another aspect, when the film cassette 2 is removed from the support mechanism 120, the resilient retardant portion 124 can be pulled away slightly to separate the top of the film cassette 2 therefrom. At this point, the sliding portion 132 of the rotating member 130 slides upward along the sliding groove 121 due to resilience of the resilient element 140. The first transmission shaft 131 of the rotating member 130, at the same time, rotates clockwise to close the masking gate 21 of the film cassette 2. When the sliding portion 132 of the rotating member 130 slides upward to the highest part of the sliding groove 121, the film cassette 2 can be removed from the support mechanism 120.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A film holder for an advanced photo system, comprising:
    a transmission mechanism;
    a support mechanism connected to the transmission mechanism and having a sliding groove obliquely formed thereon;
    a rotating member disposed in the support mechanism and having a first transmission shaft and a sliding portion engaged with and sliding in the sliding groove of the support mechanism; and
    a resilient element disposed on the support mechanism and connected to the sliding portion of the rotating member.

2. The film holder as claimed in claim 1, further comprising a second transmission shaft disposed in the support mechanism.

3. The film holder as claimed in claim 2, further comprising a motor disposed in the support mechanism and connected to the second transmission shaft.

4. The film holder as claimed in claim 1, wherein the support mechanism further comprises a connecting portion, with the resilient element connected between the connecting portion and the sliding portion of the rotating member.

5. The film holder as claimed in claim 4, wherein the support mechanism further comprises a wall, and the connecting portion and sliding groove are formed on the wall.

6. The film holder as claimed in claim 5, further comprising a resilient retardant portion formed on the wall.

7. The film holder as claimed in claim 1, further comprising a resilient retardant portion formed on the support mechanism.

8. The film holder as claimed in claim 1, wherein the resilient element is a spring.

9. The film holder as claimed in claim 1, further comprising a film cassette supported by the support mechanism.

10. The film holder as claimed in claim 9, wherein the film cassette further comprises a masking gate, an unlocking hole, a film transmission hole and a film, the first transmission shaft of the rotating member engaged with the unlocking hole and rotating to unlock the masking gate by means of the sliding portion sliding in the sliding groove.

11. The film holder as claimed in claim 10, further comprising a second transmission shaft disposed in the support mechanism and engaged with the film transmission hole of the film cassette, the film therein transmitted to the transmission mechanism via the masking gate by rotation of the second transmission shaft.

12. The film holder as claimed in claim 11, further comprising a motor disposed in the support mechanism and connected to the second transmission shaft.

13. The film holder as claimed in claim 11, further comprising a resilient retardant portion formed on the support mechanism, wherein the film cassette is disposed in the support mechanism by means of retard of the resilient retardant portion.

* * * * *